(12) United States Patent
Farmer

(10) Patent No.: US 7,607,595 B2
(45) Date of Patent: Oct. 27, 2009

(54) MULTIPURPOSE ACCESSORY FOR AN ALL TERRAIN VEHICLE

(76) Inventor: Thomas E. Farmer, 1602 Biovu, Galveston, TX (US) 77551

( * ) Notice: Subject to any disclaimer, the term of this patent is extended or adjusted under 35 U.S.C. 154(b) by 0 days.

(21) Appl. No.: 10/941,208

(22) Filed: Sep. 15, 2004

(65) Prior Publication Data

US 2006/0011754 A1    Jan. 19, 2006

Related U.S. Application Data

(60) Provisional application No. 60/585,625, filed on Jul. 6, 2004.

(51) Int. Cl.
*E01C 19/20* (2006.01)
(52) U.S. Cl. ............... 239/661; 239/650; 239/663; 239/668; 239/681; 239/687; 224/42.32; 111/11
(58) Field of Classification Search ......... 239/650–689, 239/722, 172; 224/42.32, 42.33, 274, 401, 224/402, 412; 111/130–133, 11–13
See application file for complete search history.

(56) References Cited

U.S. PATENT DOCUMENTS

| | | | | |
|---|---|---|---|---|
| 2,350,476 | A * | 6/1944 | Richey | 239/664 |
| 2,442,743 | A * | 6/1948 | Wester | 239/657 |
| 2,717,783 | A * | 9/1955 | Flink | 239/650 |
| 2,774,602 | A * | 12/1956 | Sanderson | 239/657 |
| 2,856,191 | A * | 10/1958 | Kolb | 239/657 |
| 3,014,729 | A * | 12/1961 | Henningsen et. al. | 239/670 |
| 4,176,771 | A | 12/1979 | Dubroc, Sr. | |
| 4,234,109 | A * | 11/1980 | Goodhart | 222/609 |
| 4,382,568 | A | 5/1983 | Schertz | |
| 4,402,438 | A | 9/1983 | Gregory | |
| 5,375,773 | A * | 12/1994 | Lewis | 239/650 |
| 5,400,974 | A * | 3/1995 | Musso et al. | 239/672 |
| 5,573,162 | A * | 11/1996 | Spencer et al. | 224/401 |
| 5,820,035 | A * | 10/1998 | Johnson et al. | 239/684 |
| 6,149,079 | A * | 11/2000 | Kinkead et al. | 239/668 |
| 6,179,180 | B1 | 1/2001 | Walker | |
| 6,321,611 | B1 | 11/2001 | Szu et al. | |
| 6,378,748 | B1 | 4/2002 | Cox | |
| 6,401,557 | B1 | 6/2002 | Davies | |
| 6,422,490 | B1 * | 7/2002 | Truan et al. | 239/659 |
| 6,502,728 | B2 | 1/2003 | Savant | |

(Continued)

OTHER PUBLICATIONS

Bumper Buddy ATV Spreader; Cabela's World's Foremost Outfitter; Internet Advertisement; www.cabelas.com; downloaded May 10, 2004.

(Continued)

*Primary Examiner*—Len Tran
*Assistant Examiner*—Jason J Boeckmann
(74) *Attorney, Agent, or Firm*—Gordon & Jacobson, PC

(57) ABSTRACT

An accessory mountable to an ATV includes an extension rack that provides a substantially flat storage bed. A spreader assembly for storing and distributing granular material therefrom is supported in a position below the extension rack. In the preferred embodiment, the extension rack is mounted to the carrier rack of the ATV, and the spreader is mounted to the extension rack such that it is positioned under the extension rack. The extension rack preferably includes a door that provides a passageway to the spreader assembly and also includes side walls that are vertically disposed with respect to the substantially flat storage bed.

27 Claims, 2 Drawing Sheets

U.S. PATENT DOCUMENTS

| | | | | |
|---|---|---|---|---|
| 6,637,678 B2 * | 10/2003 | Wyne | ................ | 239/663 |
| 6,659,566 B2 | 12/2003 | Bombardier | | |
| 6,698,997 B2 * | 3/2004 | Arne et al. | ................ | 414/502 |
| 6,715,703 B2 * | 4/2004 | Kost et al. | ................ | 239/687 |
| 2002/0175230 A1 * | 11/2002 | Wyne | ................ | 239/663 |

OTHER PUBLICATIONS

Pictures A,B,C of broadcast feeders commerically-available from All Seasons Feeders of SanAntonio,TX. Picture A dated Aug. 20, 2003, Picture B dated Feb. 5, 2004, Picture C dated Jun. 14, 2004.

* cited by examiner

000
MULTIPURPOSE ACCESSORY FOR AN ALL TERRAIN VEHICLE

This application claims priority to U.S. Provisional Patent Application No. 60/585,625, filed on Jul. 6, 2004, herein incorporated by reference in its entirety.

BACKGROUND OF THE INVENTION

1. Field of the Invention

The invention relates generally to the field of accessories that are mounted onto an all terrain vehicle (ATV), and more particularly to multipurpose carrier accessories that are readily mounted to factory installed or pre-existing carrier rack assemblies.

2. State of the Art

All terrain vehicles (ATVs) are popular as a mode of transportation, particularly for various types of off-road activities. Typically, an ATV is equipped with a factory installed (or other pre-existing) carrier rack. The carrier rack generally consists of a plurality of tubular members that are mounted to the frame of the ATV. The tubular members are arranged to form a horizontal support area and spaced apart in a manner that allows various items such as tents, guns, fishing poles, tackle boxes, other field equipment, to be removably attached thereto using rope, bungee cords and the like.

The rugged nature of the ATVs has also made it popular as a utility vehicle. For such purposes, it is cumbersome to repeatably lash items to the factory-installed carrier racks. Thus, it has become popular to mount accessory extension racks onto such factory-installed carrier racks. The extension racks provide a flat storage bed that is useful for carrying diverse items and animals, such as containers, bags, gear, tools, dogs, etc. An example of such an extension rack is illustrated in U.S. Pat. No. 6,502,728 to Savant.

It is also known to mount a spreader accessory to the top of an ATV carrier rack. For example, an ATV-mounted spreader accessory known as the "Bumper-Buddy" is sold commercially. It includes a conical hopper (20-gallon/50-lb. capacity) that is mounted behind and above the ATV rear rack by bolt mount clamps. A spreader mechanism that includes an aluminum flow control valve, spinner plate and motor are supported underneath the conical hopper. The spreader accessory provides for distribution of large quantities of seed, corn, granulated salt and other dry pellet material.

While the Bubby-Buddy spreader is useful, it suffers from several drawbacks. For example, because the spreader accessory is mounted on the ATV rear rack, an extension rack cannot also be mounted onto the rear rack due to interference between the two accessories. In the event that a user desires the functionality provided by both of these accessories, the user must independently demount and alternatively mount the respective accessories onto the ATV rear rack, which is cumbersome and time consuming. In addition, because the Bumper Buddy spreader is mounted above the ATV rear rack, it significantly obstructs rear vision, obstructs normal access and use of the rear rack, and also undesirably moves the center of gravity of the ATV so that the ATV is more prone to roll-over.

SUMMARY OF THE INVENTION

It is therefore an object of the invention to provide an accessory mountable to an ATV that provides both a flat storage bed as well as a spreader mechanism suitable for storage and distribution of large quantities of dry pellet material.

It is another object of the invention to provide a multipurpose accessory for an ATV that is capable of carrying a wide variety of diverse loads and simultaneously capable of storing and distributing large quantities of dry pellet material, thus avoiding the need to switch between accessories.

It is a further object of the invention to provide a spreader apparatus that is supported by an ATV in a manner that provides the operator with an unobstructed view while operating the ATV.

It is another object of the invention to provide a spreader apparatus that is supported by an ATV in a manner that provides the operator with unobstructed normal access and use of a rear-mounted extension rack.

It is also an object of the invention to provide a spreader accessory that is supported by an ATV in a manner that lowers the center of gravity of the vehicle, thereby enhancing stability and making the vehicle a bit more resistant to rollover.

In accord with these objects, which will be discussed in detail below, an accessory mountable to an ATV includes an extension rack that provides a substantially flat storage bed. A spreader assembly for storing and distributing granular material therefrom is supported in a position below the extension rack. In the preferred embodiment, the extension rack is mounted to the rear rack of the ATV, and the spreader is mounted to the extension rack such that it is positioned under the extension rack. The extension rack preferably includes a door that provides a passageway to the spreader assembly and also includes side walls that are vertically disposed with respect to the substantially flat storage bed.

It will be appreciated that the multi-purpose ATV accessory of the present invention is positioned completely out of the way of the user and can be left in place. This feature enables the operator to avoid the time required to switch between accessories. It also provides the operator with an unobstructed view while operating the ATV together with unobstructed normal access and use of the extension rack. In addition, supporting the spreader accessory beneath the extension rack lowers the center of gravity of the vehicle, thereby enhancing stability and making the vehicle a bit more resistant to rollover.

Additional objects and advantages of the invention will become apparent to those skilled in the art upon reference to the detailed description taken in conjunction with the provided figures.

DETAILED DESCRIPTION OF THE PREFERRED EMBODIMENTS

Figure 1:
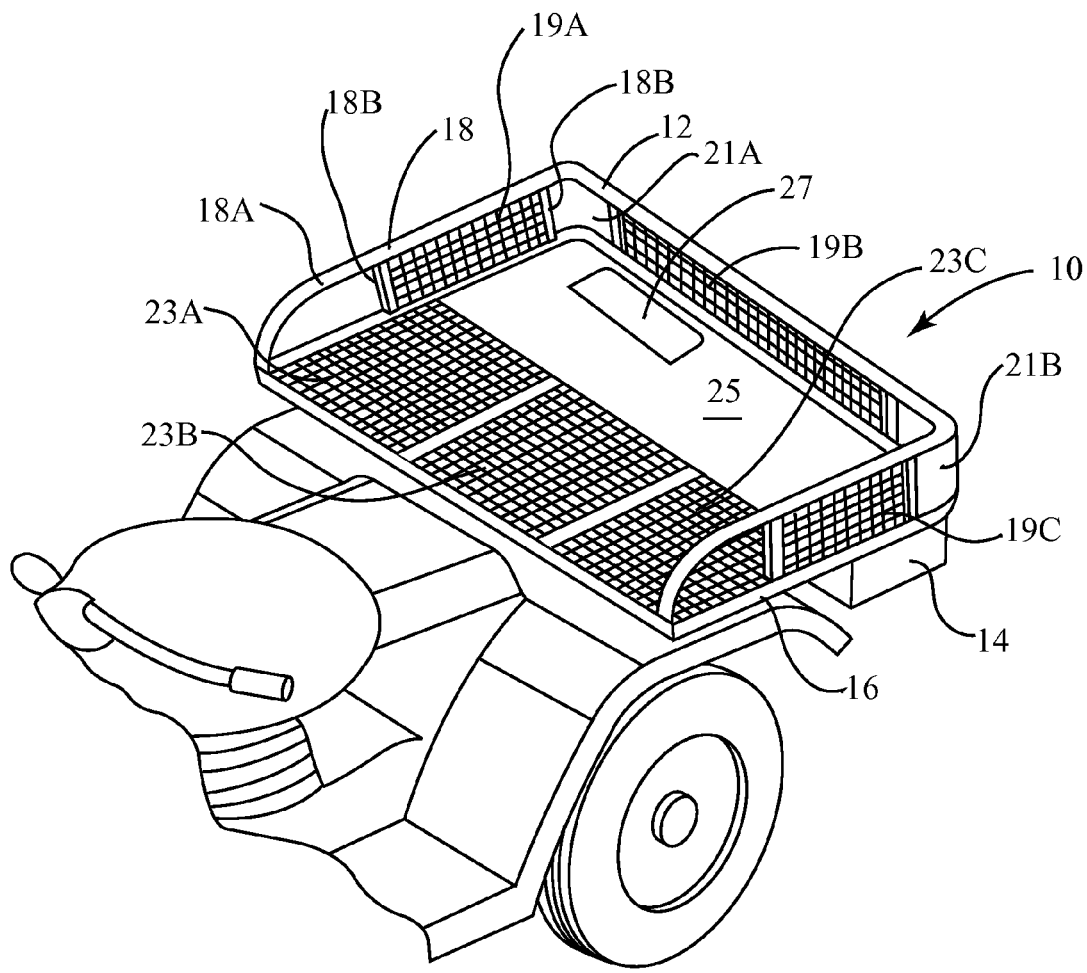
FIG. 1 is an isometric view of an illustrative embodiment of a multipurpose accessory for an ATV in accordance with the present invention.

Turning now to FIG. 1, there is shown an ATV accessory 10 in accordance with the present invention. The ATV accessory 10 is mounted to the rear rack of the ATV. More specifically, a factory-installed (or other pre-existing) rear rack is affixed to the frame of the ATV. The rear rack includes a plurality of tubular members that provide a horizontal support area above the rear fenders of the ATV as is conventional. The rear rack is hidden by the accessory 10 in FIG. 1 and thus not shown. The accessory 10 includes an extension rack 12 that provides a flat storage bed as well as a spreader assembly 14 mounted below the extension rack 12.

The extension rack 12 includes a base frame 16 and a side frame 18 both constructed from tubular members. The base frame substantially extends in the horizontal plane and is attached to the pre-existing rear rack utilizing bolted-collars, spring-clips, brackets, or other suitable fastening mechanisms. The side rail frame 18 is vertically displaced from the base frame 16 and preferably includes a rail 18A, vertical supports 18B, metal mesh sections 19A, 19B, 19C and metal sheet sections 21A, 21B. Similarly, the base frame 16 is preferably covered with metal mesh sections 23A, 23B, 23C and metal sheet section 25. In this manner, the covered base frame and side rail frame provide a flat storage bed that is suitable for carrying a wide range of diverse items.

Figure 2:
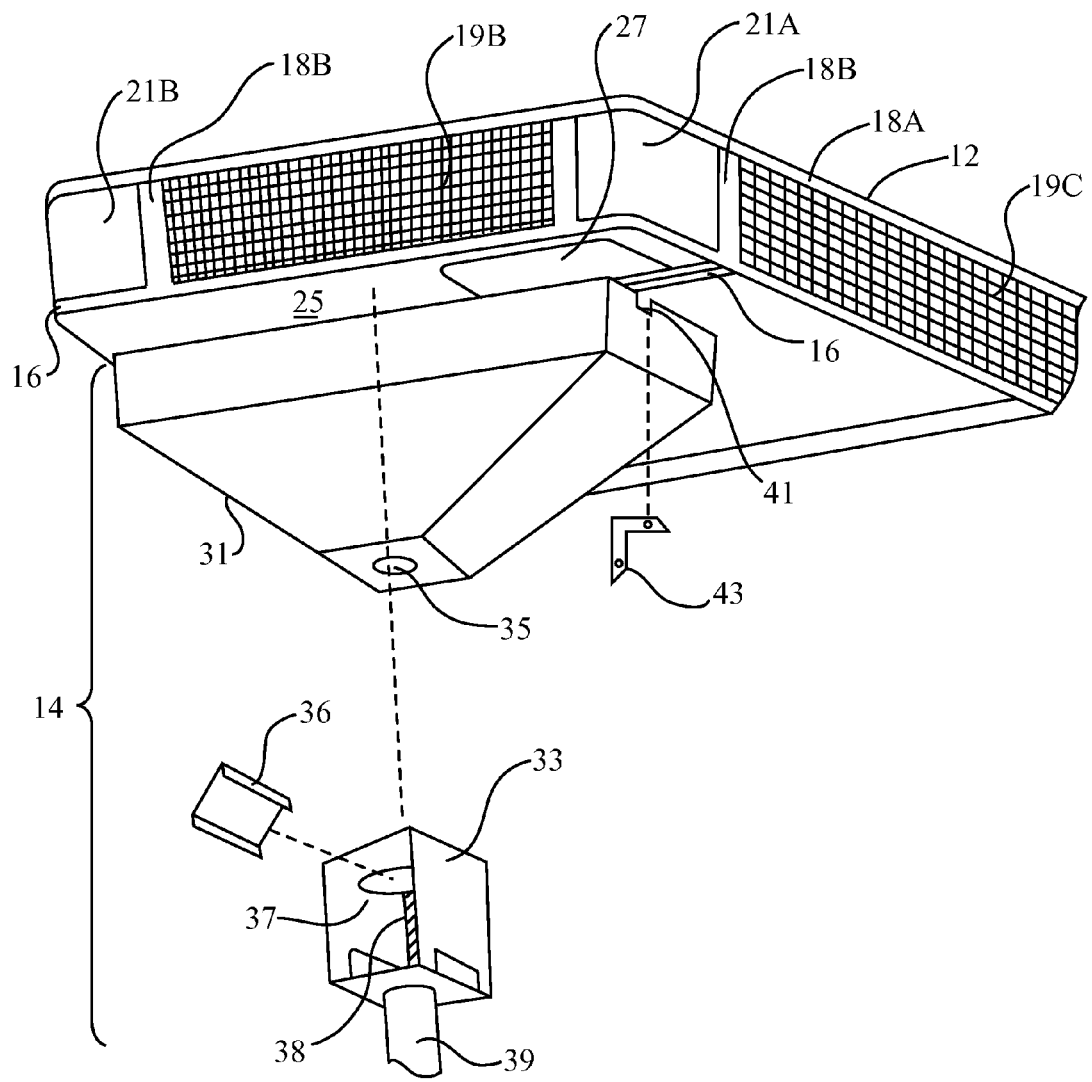
FIG. 2 is an exploded view of the multipurpose accessory of FIG. 1 in accordance with the present invention.

In accordance with the present invention, a door 27 is provided through the metal sheet 25 towards the rear of the extension rack 12 as shown in FIGS. 1 and 2. The door 27 provides a passageway to the spreader assembly 14 that is disposed below the extension rack 12.

The spreader assembly 14 includes a gravity-feed hopper 31 and a dispensing mechanism 33 mounted thereunder. The hopper 31 is filled by loading material (e.g., seed, fertilizer, granulated lime, granulated salt, etc) through the door 27 and empties via outlet 35. The dispensing mechanism 33 includes a spring-loaded gate 36 that slides relative to the outlet 35 to selectively control the flow rate of material exiting the outlet 35. The position of the gate 36 is preferably controlled by pulling a wire/cable (not shown) to thereby open and close the gate. The dispensing system 33 also includes a spinner plate 37 that is operably coupled via rotating shaft 38 to an electric motor 39. When the motor 39 is powered on, the rotating shaft 38 rotates, thereby driving rotation of the spinner plate 37. When the spinner plate 37 rotates, material that exits the outlet 35 is distributed over a large area behind the spreader. Push button control can be used to selectively power the electrical motor on and off and thereby provide user control over distribution by the spinner plate. Alternatively, the dispensing mechanism 33 may include a motor-driven closure mechanism as described in U.S. Pat. No. 5,820,035, herein incorporated by reference in its entirety.

The hopper 31 may include slots 41 in its structure that conform to the geometry of the base frame structure 16 of the extension rack 14 as shown in FIG. 2. These slots enable the top of the hopper 31 to mount flushly to the underside of the extension rack 14. The spreader assembly 14 is preferably mounted below the extension rack 16 by L-shaped brackets 43 (one shown) and bolts that join the hopper 31 to the base frame structure 16 as shown in FIG. 2. Alternatively, the hopper 31 (and spreader assembly 14) may be permanently affixed to the extension rack 12 by welding or other means.

It will be appreciated that ATVs typically include a rear hitch point that is used to removably couple a trailer thereto. The dispensing mechanism 33 is preferably located above the horizontal plane of the rear hitch point such that it does not interfere with the use of the rear hitch point.

The ATV accessory 10 of the present invention has many advantages. Because the hopper 31 and dispensing apparatus 33 are operably disposed under the extension 16 and completely out of the way of the user, they may be left in place. This feature enables the operator to avoid the time required to switch between accessories. It also provides the operator with an unobstructed view while operating the ATV together with unobstructed normal access and use of the extension rack. In addition, supporting the spreader accessory beneath the deck of the extension rack lowers the center of gravity of the vehicle, thereby enhancing stability and making the vehicle a bit more resistant to rollover.

There have been described and illustrated herein embodiments of a multipurpose accessory for an all terrain vehicle. While particular embodiments of the invention have been described, it is not intended that the invention be limited thereto, as it is intended that the invention be as broad in scope as the art will allow and that the specification be read likewise. Thus, while particular hopper and dispensing mechanisms have been disclosed, it will be appreciated that other hopper and dispensing mechanisms can be used as well. For example, and not by way of limitation, the hopper and possibly the dispensing mechanism (or parts thereof) may be partitioned into multiple sections (e.g., with baffle(s)) in a manner that allows mixing of seeds and/or fertilizer of varying size and weight to be distributed simultaneously at the desired rate of dispersion. In another example, the hopper (and/or dispensing mechanism) can be designed to slide in and out of position below the extension rack utilizing, for example, a rail system. To load material into the hopper, the hopper would be slid out to allow the material to be poured into the hopper. After loading, the hopper is slid into position under the extension rack and secured for normal operation. Alternatively, one or more doors may be provided at (or near) the top of the side(s) of the hopper which are opened to load material into the hopper. In these configurations, the door through the floor of the extension rack may be omitted, and the hopper and dispensing mechanism can be readily adapted to be mounted under pre-existing extension racks by attachment to the extension rack, by attachment to the ATV frame or by other suitable means. Moreover, while particular configurations have been disclosed in reference to extension rack and mechanism for mounting the extension rack to the rear carrier rack of the all terrain vehicle, it will be appreciated that other configurations could be used as well. For example, the hopper and dispensing mechanism may be integrated with extension racks that have different sizes and shapes as those described herein. For example, a multi-level extension rack and/or an extension rack that extends down below the pre-existing rack cargo area. In another example, the extension rack and the dispensing mechanism mounted therebelow may be integrated into a front carrier rack of the ATV. In yet another example, the hopper and spreader assembly of the present invention may be adapted to mount to commercially-available ATV extension racks. It will therefore be appreciated by those skilled in the art that yet other modifications could be made to the provided invention without deviating from its spirit and scope as claimed.

What is claimed is:

1. An apparatus mountable to an ATV comprising:
   an extension rack providing a storage bed having a generally planar support surface with a top side opposite a bottom side and sidewalls that extend upward from said support surface, said extension rack mountable to the ATV in a position above the rear tires of the ATV and extending rearward beyond the rear tires of the ATV; and
   a spreader assembly having a hopper separate and distinct from said extension rack, and a dispensing mechanism with an electric motor, said hopper for bulk storage of granular material therein and said dispensing mechanism for distributing granular material stored in the hopper, said hopper having a top surface defining the upper boundary of said hopper spaced from an outlet port defining the lower boundary of said hopper, the outlet port leading to said dispensing mechanism, wherein said spreader assembly includes fastening means for attaching said hopper to said bottom side of said generally planar support surface of said extension rack such that the top surface of said hopper is positioned adjacent to and under the bottom side of said generally planar support surface of said extension rack, and said spreader assembly comprises a flow control mechanism disposed below said outlet port that selectively controls flow rate of material exiting said outlet port of said hopper.

2. An apparatus according to claim 1, wherein:
said extension rack includes a door that provides a passageway to said hopper.

3. An apparatus according to claim 2, wherein:
said door is disposed in a horizontal plane that defines said generally planar support surface.

4. An apparatus according to claim 1, wherein:
said extension rack is secured to said ATV in a fixed horizontal orientation.

5. An apparatus according to claim 1, wherein:
said flow control mechanism comprises a spring-loaded gate.

6. An apparatus according to claim 1, wherein:
said dispensing mechanism of said spreader assembly comprises a spinner plate that is driven by said electric motor.

7. An apparatus according to claim 6, wherein:
said flow control mechanism is part of said dispensing mechanism.

8. An apparatus according to claim 1, further comprising:
means for mounting said dispensing mechanism to said hopper such that said dispensing mechanism is positioned under said hopper.

9. An apparatus according to claim 1, wherein:
said granulated material is selected from the group comprising seeds, fertilizer granulated lime, granulated salt, other dry pellet material.

10. An apparatus according to claim 1, wherein:
said extension rack comprises a base frame that extends substantially in a horizontal plane, the base frame constructed from a plurality of tubular members.

11. An apparatus according to claim 1, wherein:
said generally planar support surface of the extension rack has a forward end opposite a rear end, and one of said sidewalls extends upward along the rear end of said support surface, and the fastening means attaches said hopper to said bottom side of said support surface of said extension rack such that the top surface of said hopper is positioned forward of the one sidewall extending along the rear end of said support surface.

12. An apparatus for use with an extension rack that is mounted to an ATV, the extension rack providing a storage bed having a generally planar support surface with a top side opposite a bottom side and sidewalls that extend upward from said support surface, said extension rack mountable to the ATV in a position above the rear tires of the ATV and extending rearward beyond the rear tires of the ATV, the apparatus comprising:
a spreader assembly having a hopper separate and distinct from said extension rack, and a dispensing mechanism with an electric motor, said hopper for bulk storage of granular material therein and said dispensing mechanism for distributing granular material stored in the hopper, said hopper having a top surface defining the upper boundary of said hopper spaced from an outlet port defining the lower boundary of said hopper, the outlet port leading to said dispensing mechanism, wherein said spreader assembly includes fastening means for attaching said hopper to said bottom side of said generally planar support surface of said extension rack such that the top surface of said hopper is positioned adjacent to and under the bottom side of said generally planar support surface of said extension rack, wherein said hopper has an outlet port leading to said dispensing mechanism, and said spreader assembly comprises a flow control mechanism disposed below said outlet port that selectively controls flow rate of material exiting said outlet port of said hopper.

13. An apparatus according to claim 12, wherein:
said flow control mechanism comprises a spring-loaded gate.

14. An apparatus according to claim 12, wherein:
said dispensing mechanism of said spreader assembly comprises a spinner plate that is driven by said electric motor.

15. An apparatus according to claim 14, wherein:
said flow control mechanism is part of said dispensing mechanism.

16. An apparatus according to claim 12, further comprising:
means for mounting said dispensing mechanism to said hopper such that said dispensing mechanism is positioned under said hopper.

17. An apparatus according to claim 12, wherein:
said granulated material is selected from the group comprising seeds, fertilizer granulated lime, granulated salt, other dry pellet material.

18. An apparatus according to claim 12, wherein:
said generally planar support surface of the extension rack has a forward end opposite a rear end, and one of said sidewalls extends upward along the rear end of said support surface, and the fastening means attaches said hopper to said bottom side of said support surface of said extension rack such that the top surface of said hopper is positioned forward of the one sidewall extending along the rear end of said support surface.

19. An ATV comprising:
a frame;
a rack that is operably coupled to said frame and providing a storage bed having a generally planar support surface with a top side opposite a bottom side and sidewalls that extend upward from said support surface, said rack mountable to the ATV in a position above the rear tires of the ATV and extending rearward beyond the rear tires of the ATV; and
a spreader assembly having a hopper separate and distinct from said rack, and a dispensing mechanism with an electric motor, said hopper for bulk storage of granular material therein and said dispensing mechanism for distributing granular material stored in the hopper, said hopper having a top surface defining the upper boundary of said hopper spaced from an outlet port defining the lower boundary of said hopper, the outlet port leading to said dispensing mechanism, wherein said spreader assembly includes fastening means for attaching said hopper to said bottom side of said generally planar support surface of said rack such that the top surface of said hopper is positioned adjacent to and under the bottom side of said generally planar support surface of said extension rack, wherein said hopper has an outlet port leading to said dispensing mechanism, and said spreader assembly comprises a flow control mechanism disposed below said outlet port that selectively controls flow rate of material exiting said outlet port of said hopper.

20. An ATV according to claim 19, wherein:
said rack includes a door that provides a passageway to said hopper.

21. An ATV according to claim 20, wherein:

said door is disposed in a horizontal plane that defines said generally planar support surface.

22. An ATV according to claim 19, further comprising:

means for mounting said dispensing mechanism to said hopper such that said dispensing mechanism is positioned under said hopper.

23. An ATV according to claim 19, wherein:

said granulated material is selected from the group comprising seeds, fertilizer granulated lime, granulated salt, other dry pellet material.

24. An ATV according to claim 19, wherein:

said dispensing mechanism of said spreader assembly comprises a spinner plate that is driven by said motor.

25. An ATV according to claim 24, wherein:

said flow control mechanism is part of said dispensing mechanism.

26. An ATV according to claim 19, wherein:

said rack is secured to said ATV in a fixed horizontal orientation.

27. An ATV according to claim 19, wherein:

said generally planar support surface of the extension rack has a forward end opposite a rear end, and one of said sidewalls extends upward along the rear end of said support surface, and the fastening means attaches said hopper to said bottom side of said support surface of said extension rack such that the top surface of said hopper is positioned forward of the one sidewall extending along the rear end of said support surface.

* * * * *